Feb. 22, 1949.    C. L. NORDEN    2,462,541
ERECTING SYSTEM FOR GYROSCOPES
Filed Oct. 17, 1945    2 Sheets-Sheet 1
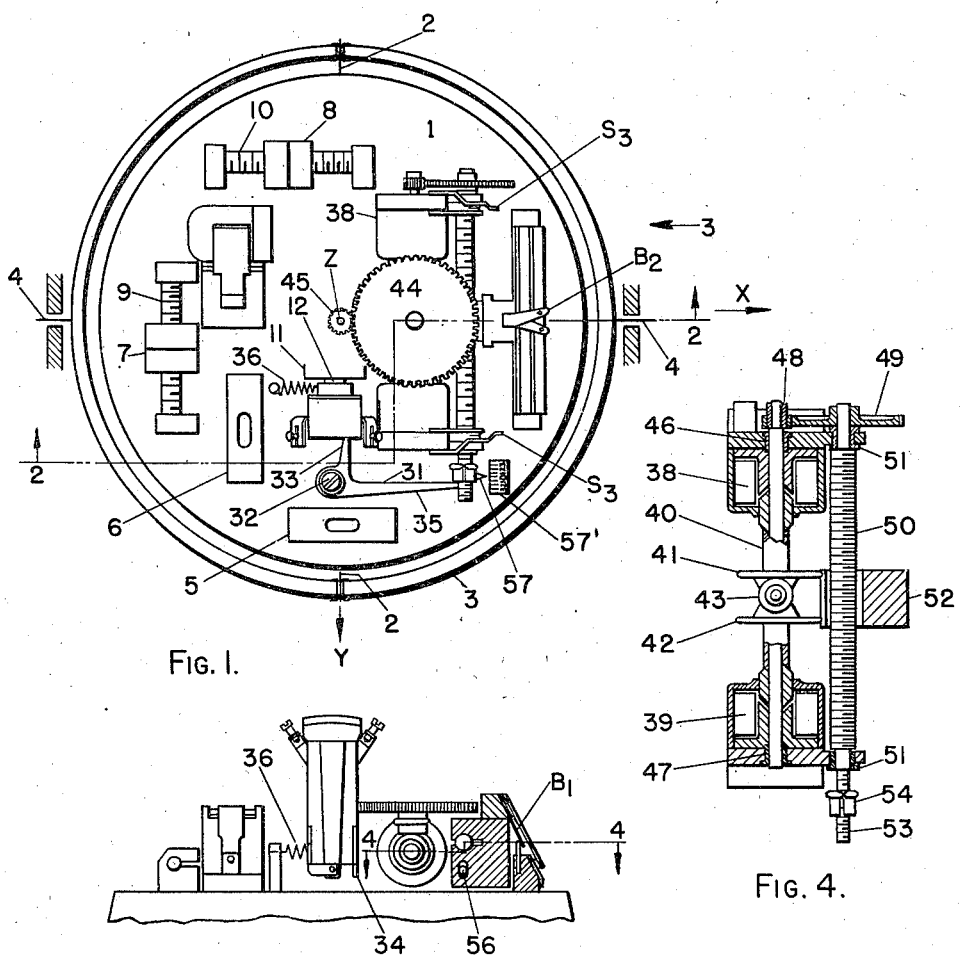
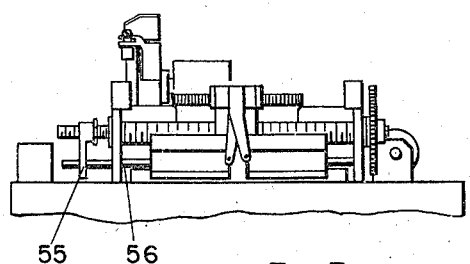
INVENTOR
Carl L. Norden
BY
Sawyer & Kennedy
ATTORNEYS Feb. 22, 1949.    C. L. NORDEN    2,462,541
ERECTING SYSTEM FOR GYROSCOPES
Filed Oct. 17, 1945    2 Sheets-Sheet 2

INVENTOR
Carl L. Norden
BY
Sawyer & Kennedy
ATTORNEYS

Patented Feb. 22, 1949

2,462,541

UNITED STATES PATENT OFFICE 2,462,541

ERECTING SYSTEM FOR GYROSCOPES

Carl L. Norden, New York, N. Y., assignor, by mesne assignments, to The Norden Laboratories Corporation, White Plains, N. Y., a corporation of Connecticut Application October 17, 1945, Serial No. 622,837

9 Claims. (Cl. 74—5.44)

1

This invention relates to improvements in devices for indicating the direction of gravity or an acceleration.

The device of the invention is primarily applicable to uses such as indicating tilt of an element, such as a gyro, from the apparent vertical and utilizing servo mechanism for correcting such tilt.

The device is also applicable to any use requiring an indication of the direction of an acceleration or for the operation of mechanism to preserve the desired direction of a member with respect to such acceleration.

It is an object of the invention to provide a substantially aperiodic rapid acting inclinometer which is capable of accurately measuring the direction of apparent gravity or of an acceleration.

Another object of the invention is to provide erecting mechanism for gyros which is of a rapid and accurately proportional type whereby it is possible to integrate lateral accelerations affecting an aircraft or other vehicle so that the direction assumed by the gyro will correspond as closely as may be to a static plumb line vertical, the effect of transient accelerations and in particular oscillatory or periodic lateral accelerations being canceled out by so integrating.

With the foregoing objects and still other objects which will appear in the following description in mind, the invention consists in the combinations and arrangements of parts and details of construction which will now first be fully described in connection with the accompanying drawing and then be more particularly pointed out in the appended claims.

In the drawing:

Figure 1 is a plan view of a gyro rotor housing and cardan assembly equipped with erecting mechanism embodying the invention in a preferred form;

Figure 2 is a section taken on the line 2—2 of Figure 1, and omitting certain parts for clarity;

Figure 3 is an elevation view looking in the opposite direction to the vector X of Figure 1;

Figure 4 is a horizontal section taken on the line 4—4 of Figure 2;

Figures 5, 6, 7:
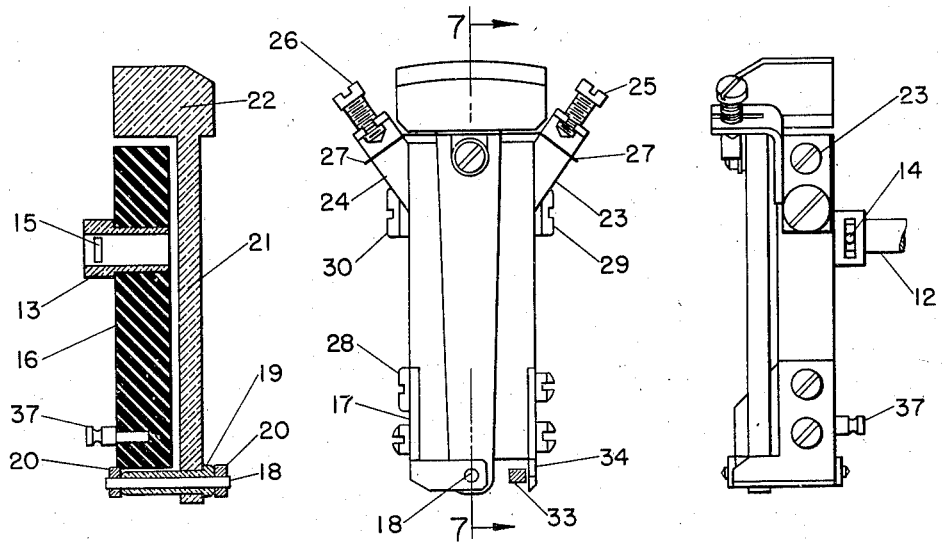
Figure 5 is a side elevation view (orientation of Figure 3) of an inverted pendulum unit.
Figure 6 is a front elevation (orientation of Figure 2) of this unit.
Figure 7 is a section taken on the line 7—7 of Figure 6.

Referring now principally to Figure 1, the gyro rotor casing 1 is carried by means of gudgeons or trunnions 2 in the cardan 3 which in turn is carried by means of gudgeons or trunnions 4 in any suitable frame member in an aircraft or other vehicle. This assembly thus forms the

2 usual Cardan or Foucault gimbal suspension for the gyro. The gyro rotor details, known in themselves, form no part of the present invention and hence, are not shown. The erecting system of the invention may be applied to a gyro such as shown, for example, in Barth application, Serial No. 331,479, filed April 24, 1940 for Aircraft control system, or to gyros of various other types.

As will be understood, the spin axis of the gyro rotor will be located centrally of the housing 1 and hence perpendicular to the plane of the paper in Figure 1 of the drawing, and the spin vector, being directed vertically downward, is represented by a vector Z along the spin axis and directed into the paper, following the usual conventions. The cardan and rotor axes of rotation are represented by vectors X and Y, which are indicated by correspondingly lettered arrows in the figure and form with the spin vector Z a tri-axial system. The angular movements and velocities of the gyro housing as well as the torques may be described with reference to this tri-axial system, adopting the usual right hand screw rule, according to which a torque or rotation in counterclockwise direction when viewed backwards along the vector is considered positive and a clockwise rotation or torque is considered negative.

The usual spirit level elements or "bubbles" 5 and 6, for indicating tilt about the Y and X axes, are shown in Figure 1 and may be utilized upon a gyro equipped with the present invention. They do not affect the operation, however, and are omitted from the other views for clarity in the showing. Counter-weights 7 and 8 carried on screw threaded rods 9 and 10 upon the rotor housing 1 are utilized, balancing the housing as a whole, including the apparatus later described, with reference to the X and Z planes. While the invention in its broader aspects is applicable to gyros of various other types, it is shown as applied to a free vertical gyro and the gyro rotor housing and apparatus mounted thereon is balanced also with reference to the XY plane so as to provide a neutral gyro in which the three axes intersect at the center of gravity of the entire rotor assembly.

The equipment of the present invention may be characterized as a "mechanical bubble" which serves the level indicating function of a spirit level bubble, such as the bubble 5 or 6, but in addition can provide an accurate measure of the angle of tilt and is capable of producing and controlling power for the purpose of operating mechanism in accordance with the angle of tilt so measured.

The sensitive element of the invention preferably comprises an inverted pendulum which will indicate direction of tilt by making an electrical contact to one side or the other. Servo mechanism operated in the one direction or the other according to the side of the pendulum which makes contact is utilized in conjunction with a follow-up system to restore the inverted pendulum supporting frame to the apparent vertical and maintain it in the apparent vertical position. The cumulated action or displacement of the servo mechanism will accordingly indicate tilt of any object upon which the inverted pendulum is placed and the servo mechanism may, therefore, be used to operate, directly or indirectly, any desired devices, such as torque producing devices, for erecting a gyro upon which the inverted pendulum is mounted. In the drawing, the erecting system of the invention is shown as applied to the Y axis. A similar system may be utilized for the X axis, or any other desired erecting system, such, for example, as the bail erecting system shown in Barth application, Serial No. 331,479, may be employed for this axis.

The pendulum unit, which is shown in full detail in Figures 5-7, is pivotally carried on a support 11 by means of a pin or stub shaft 12 which is received into the bearing bushing 13 and held therein longitudinally, as by means of a pin 14 inserted in the shaft 12 and riding in circumferential slot 15 in the wall of the bushing 13. The bushing 13 carries a frame or body member 16, preferably made of formica or other suitable insulating material, affixed to the lower end of which is a bracket 17 serving to mount the inverted pendulum proper. The inverted pendulum is carried on a pin or shaft 18 by means of bushing 19 pressed or driven thereon and upon which the pendulum 21 is, in turn, pressed or driven, this assembly being rotatably or pivotally mounted by the journaling of the pin 18 in the pair of arms 20 formed on the bracket member 17. The pendulum 21 thus pivots back and forth freely about the axis of the pin 18 and is formed with an enlarged head 22 which tends to concentrate the mass as far as possible away from this axis. The frame member 16 carries also a pair of brackets 23, 24 serving to mount the adjustable contact screws 25, 26 in position for engagement by a contact member 27 which is carried by the inverted pendulum 21. In the figures, the screws 25 and 26 are shown for clarity as adjusted back to provide a wide spacing between their tips and the contact member 27. It will be understood, however, that in actual use these screws will be adjusted so as to provide a clearance for the contact member of the order of a few thousandths of an inch, so as to achieve high sensitivity. The entire pendulum 21 and its bearing bracket 17 form a connection from the contact member 27 to a connecting screw 28 upon the bracket 17 and connection is made to the contact screw 25 and 26 by means of similar connection screws 29 and 30 carried by the brackets 23 and 24. The entire assembly shown in Figures 5, 6 and 7 may be, and preferably is, balanced about the axis of shaft 12, avoiding torque variation due to angular movement about this axis.

A bell crank 31 pivoted to the rotor housing 1 at 32 (Figure 1) is utilized for rocking the frame 16 about the shaft 12, one arm 33 of this bell crank engaging against a downward projection 34 (Figures 2 and 6) fastened to the frame member 16 and the other arm 35 engaging against a nut driven by the servo mechanism, later described. The frame 16 and stop 34 are held against the arm 33 by means of a spring 36, one end of which is attached to the rotor housing and the other end of which is attached to a pin 37 upon the frame 16.

When the contact member 27 touches either contact screw 26 or contact screw 25, a circuit is established which energizes one or the other of the clutch solenoids 38 and 39, thus pulling the common solenoid plunger 40 in the one direction or the other. A pair of friction disks 41, 42 are carried by the solenoid plunger 40 for engaging a friction disk or roller 43, which element is constantly driven from the gyro rotor through gearing 44, 45. The plunger 40 is itself rotatably carried in bearings 46, 47 and will, therefore, be rotated in the one direction or the other by friction disk 41 or 42 engaging the roller 43 when solenoid 38 or 39 is energized. The axial movement of the plunger 40 required to produce the requisite pressure engagement of the disk 41 or 42 with roller 43 may be very small so that the constant or non-proportional torque factor due to movement of the plunger mass about the X axis, in either extreme position, may be regarded as negligible. Also, as clearly appears from Figure 4, a highly efficient magnetic circuit is provided, the cores and shells of the solenoids, together with the plunger armatures forming closed magnetic circuits having small air gaps in any position of the plunger 40.

Plunger 40 carries a pinion 48 in driving engagement with a gear 49 upon the screw spindle 50 which is rotatably carried in bearings 51 upon the rotor housing 1. A torque weight nut 52 in threaded engagement with spindle 50 is prevented from rotating therewith by parts later described and will, accordingly, move along the rotor housing parallel to the YZ plane as the spindle 50 is rotated. The position of nut 52 corresponding to any position of bell crank 31 and pendulum frame 16 is determined by mechanism about to be described, and the mass of the nut 52 is selected in relation thereto so as to provide a ratio between the torque exerted by the mass of nut 52 and the angle of tilt of the frame 16, which is suitable for the particular service for which the device is designed.

Spindle 50 is provided with a screw threaded extension 53 carrying a nut 54, which is prevented from rotating by a depending arm or fork 55 cooperating with a guide rod 56. Guide rod 56 also passes through an aperture in nut 52, as shown most clearly in Figure 2, and prevents this member from turning. The nut 54 accordingly moves proportionally to the nut 52, and arm 55, engaging bell crank arm 35, determines the position of the latter. Nut 54 may be provided with a pointer 57, moveable along a scale 57' for indicating the tilt of frame 16 relative to the rotor housing 1 (and hence the tilt of the housing with relation to apparent gravity) or a similar direct or remote indication may be taken off any of the members 48, 49 and 52. The device is thus adapted to measuring bank angle, glide or climb angle, or desired functions thereof, and operating flight control or bombsight elements accordingly.

Figure 8:
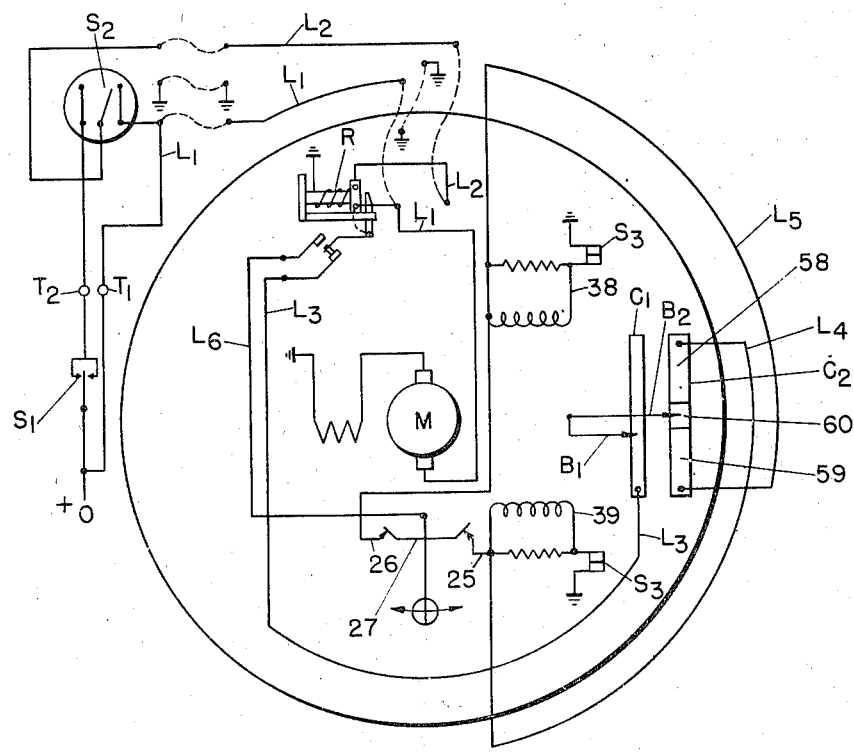
Figure 8 is a wiring diagram.

The circuit diagram of Figure 8 shows the electrical elements and connections employed for D. C. operation. The ungrounded side of a voltage source, normally the "hot" or positive wire of an available aircraft voltage supply, is connected to the terminal $T_1$. Connection for driving the rotor motor M is made from this terminal through the line $L_1$, the curved broken line segments of which (as also in the case of the other connections) indicate flexible leads to the cardan and from the cardan to the rotor housing. Connection from the voltage source is also made to a terminal $T_2$ and will normally include the usual cut-out switch $S_1$ for cutting out the erecting system when an aircraft turn through too great an angle is made. Switch $S_1$ will be associated with an azimuth gyro or other turn measuring device so as to remain open during turns through less than a selected angle (normally, about one degree) and so as to close when a turn through a greater angle is made. A centering switch $S_2$, when closed to the right, connects a line $L_2$, leading to a relay R, to the line $L_1$ so as to energize the relay and provide for centering, and, when closed to the left, connects the line $L_2$ to the terminal $T_2$ so that the relay R is normally not energized, thus providing for automatic erection.

With relay R energized, its armature establishes connection from line $L_1$ to line $L_3$ leading to the contact strip $C_1$, upon which rides a brush $B_1$ carried by the nut 52. Brush $B_1$ maintains connection between line $L_3$ and brush $B_2$, also carried by the nut 52, and the brush $B_2$ rides upon a contact strip $C_2$ controlling the centering. Strip $C_2$ includes a contact segment 58 connected to solenoid 39 through the line $L_4$ and a contact segment 59 connected to solenoid 38 through the line $L_5$. Accordingly, when brush $B_2$ is upon either of the segments 58, 59, the appropriate solenoid 38 or 39 will be energized to clutch in the screw drive to move the nut 52 toward center position. The central insulating sector 60 provides a neutral center position for the brush $B_2$. As will be noted from Figure 1, the brush $B_2$ is formed with two leaves which, taken together, span the segment 60. Adjustment of these leaves provides for a very simple and accurate adjustment of the centering sensitivity and registration of the zero torque position of nut 52 with the centered position. Limit switches $S_3$ engageable by the nut 52 are provided for cutting out solenoid 38 or 39 when the nut reaches its limit of travel and thus prevent further actuation of the solenoid until the nut has been moved back from the limit switch by actuation of the other solenoid.

When switch $S_2$ is thrown to the left, connecting line $L_2$ to the normally dead terminal $T_2$, the relay R is not energized and connection is established from line $L_1$ to line $L_6$ instead of line $L_3$. The pendulum contact spring 27, being connected to line $L_6$, will therefore energize solenoid 38 or 39, according to whether contact 27 touches contact 26 or 25, clutching in the screw spindle 50 to drive the nut 52 and thus bringing the inverted pendulum frame into alignment with the apparent vertical and simultaneously moving the torque weight nut 52 through a distance proportional to the angle of movement of the pendulum frame. The applied torque will, therefore, be proportional to the apparent tilt of the rotor housing and will cause a righting precession at an angular velocity proportional to the angle of tilt.

Referring to Figure 1 of the drawing, if it be assumed that the rotor housing 1 is tilted with respect to the apparent vertical through a positive angle about the Y axis (so that the side thereof carrying the torque weight is raised), the pendulum contact 27 will touch the contact screw 26, energizing solenoid 38 and causing friction disk 42 to engage the roller 43 and thus driving the screw spindle 50 to move the torque weight 52 toward the bell crank 31, creating a torque proportional to the apparent tilt and represented by a vector directed positively along the X axis. The precession thus produced will cause the spin axis Z to pursue the torque vector and will, accordingly, produce a negative or righting rotation about the axis Y. Meanwhile, the rotation of the screw spindle will also move nut 54 and through the bell crank 31 align the pendulum frame 16 with the apparent vertical. As the rotor housing rights itself, it will also rotate the frame 16 with respect to the apparent vertical, causing the pendulum to make contact with the contact 25, thus rotating the screw spindle in the opposite direction and moving the torque weight 52 back toward centered or zero position. Since the torque and hence the precession velocity are proportional to the angle of tilt, the law of return is exponential and hunting is prevented.

The inverted pendulum inclinometer element, being in unstable equilibrium, does not possess any natural frequency of oscillation and the servo mechanism and follow-up controlled thereby may readily be constructed so as to form with the inclinometer a system having a period of oscillation of such high frequency as not to affect the gyro.

The arrangement and construction of the contact elements shown most clearly in Figure 6 are of considerable importance in insuring good electrical contact without interfering with the mechanical action of the inverted pendulum. Each terminal portion of the contact 27 is arranged at a fairly small angle, approximately 15°, to a circle drawn about the pivotal axis of the pendulum, this arrangement insuring a wiping action as the contact 27 engages the tip of either screw 25 or 26. The position in which the pendulum stops against either contact screw is approximately a position in which the moment of the force exerted by the spring member 27 about the pendulum pivot balances the frictional resistance of the screw tip against this contact member and the moment of the pendulum weight. The force produced by the spring flexure can be regarded as normal to the spring at point of contact and hence, as is clear from the figure, is directed oppositely to the other two moments referred to. Only a very slight force will, accordingly, be required, if the apparent vertical changes or the pendulum frame is moved, to disengage the contact 27 from the tip of contact screw 25 or 26.

It will be noted that the inclinometer is responsive only to accelerations or acceleration components in the plane perpendicular to the axis of the shaft 12 and will, therefore, measure the tilt in a plane parallel to the precession which is controlled.

While the device has been described as applied to an erecting system, it may also be used as an indicator for the direction of an acceleration or for controlling various other devices. The inverted pendulum being aligned with the normal direction of the acceleration to be measured and being provided with a servo and follow-up means, a movement proportional to the angle of the arm 16 with respect to the normal or centered position may be taken off any convenient part of the system.

While the line $L_2$ is normally dead when the switch $S_2$ is thrown into the erecting position, it will be energized by the switch $S_1$ during turns, the effect of closing this switch being to energize the relay R and provide for a centering action as described above.

What is claimed is:

1. An erecting system for gyroscopes including in combination a gyroscope housing, a gyroscope rotor having a vertical spin axis positioned in said housing, means for mounting said housing for rotation about a longitudinal axis and a transverse axis, an inverted pendulum mounted upon said housing for rotation about a fixed axis, means for creating torque about an axis extending at right angles to said spin axis and at right angles to the axis of rotation of said inverted pendulum, and means responsive to said inverted pendulum for actuating said torque creating means to precess the gyroscope in a direction to bring said inverted pendulum to a position of unstable equilibrium.

2. An erecting system as in claim 1 in which said means for creating torque comprises a weight carried by said housing and means for moving said weight along a locus transverse to the spin axis of the gyroscope rotor and longitudinal of the direction of extension of the axis of rotation of the inverted pendulum.

3. An erecting system as in claim 1 in which said means for creating torque comprises a weight carried by said housing and means for moving said weight along a locus transverse to the spin axis of the gyroscope rotor and longitudinal of the direction of extension of the axis of rotation of the inverted pendulum, said means for moving said weight including means driven from the gyroscope rotor.

4. An erecting system as in claim 1 in which said means for creating torque comprises a weight carried by said housing and means for moving said weight along a locus transverse to the spin axis of the gyroscope rotor and longitudinal of the direction of extension of the axis of rotation of the inverted pendulum, said means for moving said weight including rotary means driven from said gyroscope rotor, friction disks adapted selectively to engage said rotary means and means responsive to the inverted pendulum for controlling the engagement of said friction disks.

5. An erecting system as in claim 1 in which said means for creating torque comprises a weight carried by said housing and means for moving said weight along a locus transverse to the spin axis of the gyroscope rotor and longitudinal of the direction of extension of the axis of rotation of the inverted pendulum, said means for moving said weight including rotary means driven from said gyroscope rotor, friction disks adapted selectively to engage said rotary means and means responsive to the inverted pendulum for controlling the engagement of said friction disks, said responsive means comprising a pair of electromagnets and circuit means adapted to energize one or the other of said electromagnets.

6. An erecting system as in claim 1 in which said means for creating torque comprises a weight carried by said housing and means for moving said weight along a locus transverse to the spin axis of the gyroscope rotor and longitudinal of the direction of extension of the axis of rotation of the inverted pendulum, said means for moving said weight including a screw, and means governed by said inverted pendulum for rotating said screw.

7. An erecting system as in claim 1 in which said means for creating torque comprises a weight carried by said housing and means for moving said weight along a locus transverse to the spin axis of the gyroscope rotor and longitudinal of the direction of extension of the axis of rotation of the inverted pendulum, said means for moving said weight including a screw, and means governed by said inverted pendulum for rotating said screw, a support for said inverted pendulum, means for pivotally mounting said support and means responsive to the rotation of said weight moving screw for pivoting said support.

8. An erecting system as in claim 1 in which said means for creating torque comprises a weight carried by said housing and means for moving said weight along a locus transverse to the spin axis of the gyroscope rotor and longitudinal of the direction of extension of the axis of rotation of the inverted pendulum, said means for moving said weight including a screw, and means governed by said inverted pendulum for rotating said screw, a support for said inverted pendulum, means for pivotally mounting said support and means responsive to the rotation of said weight moving screw for pivoting said support, and means for indicating the amount of tilt of said support relative to the housing of said gyroscope rotor.

9. An erecting system as in claim 1 in which said means for creating torque comprises a weight carried by said housing and means for moving said weight along a locus transverse to the spin axis of the gyroscope rotor and longitudinal of the direction of extension of the axis of rotation of the inverted pendulum, said means for moving said weight including rotary means driven from said gyroscope rotor, friction disks adapted selectively to engage said rotary means and means responsive to the inverted pendulum for controlling the engagement of said friction disks, said responsive means comprising a pair of electromagnets and circuit means adapted to energize one or the other of said electromagnets, said circuit means including centering means adapted selectively to render said inverted pendulum control inoperative and to actuate said electromagnetic means to bring said weight to a position exercising zero torque.

CARL L. NORDEN.

REFERENCES CITED

The following references are of record in the file of this patent:

UNITED STATES PATENTS

| Number | Name | Date |
| --- | --- | --- |
| 761,459 | Eastwood | May 31, 1904 |
| 1,405,807 | Tanner | Feb. 7, 1922 |
| 1,627,178 | Henry | May 3, 1927 |
| 1,845,592 | Fieux | Feb. 16, 1932 |
| 1,950,517 | Rawlings | Mar. 13, 1934 |
| 2,292,989 | Carter | Aug. 11, 1942 |
| 2,384,043 | Papello | Sept. 4, 1945 |
| 2,392,370 | Esval et al. | Jan. 8, 1946 |

FOREIGN PATENTS

| Number | Country | Date |
| --- | --- | --- |
| 695,683 | Germany | Aug. 30, 1940 |
| 547,208 | Great Britain | Aug. 18, 1942 |